United States Patent [19]
Fraser et al.

[11] 3,710,697
[45] Jan. 16, 1973

[54] FOLDING CAMERA VIEWFINDER
[76] Inventors: Richard J. Fraser, 21 Meadow Parkway, Franklin, Mass. 02038; John E. McGrath, Jr., 34 Oakland Street, Dedham, Mass. 02026
[22] Filed: Dec. 1, 1971
[21] Appl. No.: 203,735

[52] U.S. Cl. ...................................................95/47
[51] Int. Cl. ............................................G03b 11/04
[58] Field of Search .................................95/47, 42

[56] References Cited
UNITED STATES PATENTS
2,622,497  12/1952  Cornut ..................................95/42
3,630,135  12/1971  Sato ......................................95/47

FOREIGN PATENTS OR APPLICATIONS
797,110  6/1958  Great Britain ........................95/47

Primary Examiner—Samuel S. Matthews
Assistant Examiner—Michael D. Harris
Attorney—Brown and Mikulka

[57] ABSTRACT

A compact folding camera including a viewing device for framing a scene to be photographed. The viewing device includes first and second optical elements and an erecting system for moving the optical elements from an inoperative position to an operative position. The erecting system includes a latch for releasably retaining the optical elements in the inoperative position. One of the links of the erecting system is responsive to movement of the camera to its operative, extended position for releasing the latch to allow the erecting system to move the optical elements to their operative positions.

8 Claims, 3 Drawing Figures

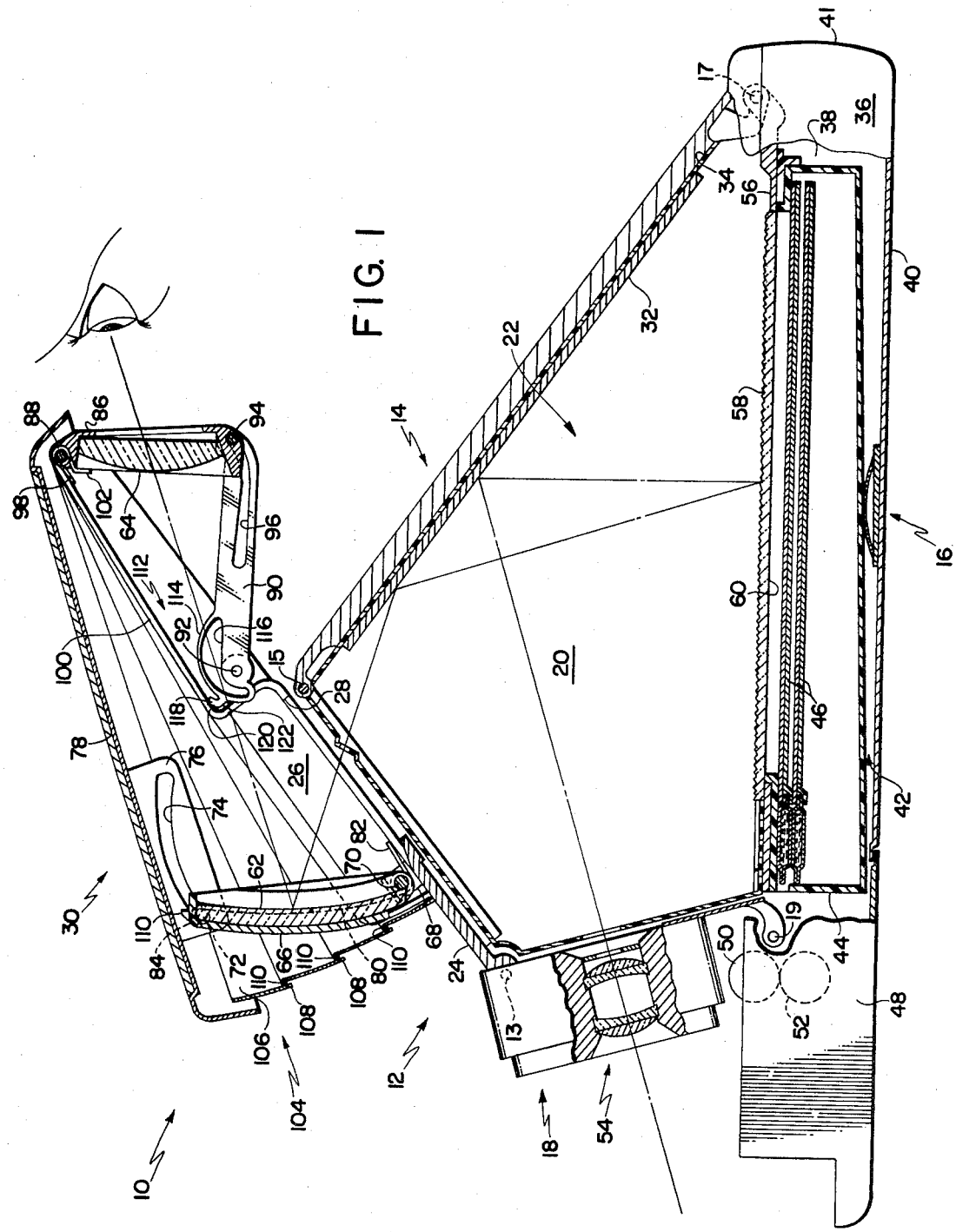

FOLDING CAMERA VIEWFINDER

BACKGROUND OF THE INVENTION

1. Field of the Invention

This invention relates to folding cameras of the type including a collapsible viewing device.

2. Description of the Prior Art

It is well known to provide cameras of the folding type with a viewing device, e.g., a rangefinder and/or viewfinder, which is mounted on the camera for movement between inoperative and operative positions. Generally, operation of cameras of the foregoing type involves two independent steps, i.e., moving various housing sections of the camera to their extended position and moving the viewing device to its operative position. Needless to say, requiring the operator of the camera to perform these independent steps results in a waste of time which could be more advantageously utilized in performing other steps of the photographic process, e.g., focusing the subject to be photographed while it is still assuming the pose which the operator wishes to capture on film. From the foregoing it can be seen that operation of the above-described cameras could be greatly enhanced if the steps of erecting the camera and its viewing device were coordinated so as to occur simultaneously.

SUMMARY OF THE INVENTION

The present invention provides a compact folding camera which includes a viewing device for providing an image of a subject to be photographed. The camera is formed by a plurality of interconnected housing sections, including first and second housing sections, which are coupled for movement between folded and extended positions. The viewing device is mounted on the first housing section and includes first and second optical elements, each of which has its own erecting means for guiding its respective optical element between inoperative and operative positions. In the inoperative position, the first and second optical elements are folded flat against the first and second housing sections for storage. The optical elements are maintained in the inoperative position by a latching arrangement including, in a preferred embodiment, a resilient detent integrally formed on one of the links of the erecting means for the second optical element. The resilient detent is adapted to be moved into locking engagement with a portion of the erecting means for the first optical element as the elements are moved into the inoperative position. Both erecting means are provided with springs for resiliently urging the first and second optical elements to the operative position. When the camera and viewing device are both in a folded or inoperative position, the second optical element and its erecting means are positioned in overlying relation to the second housing section such that the detent on the aforementioned link maintains the first optical element in the inoperative position and the engagement between the second housing section and the erecting means for the second optical element maintains the second optical element in the inoperative position.

As the camera is erected, the first and second housing sections move relative to each other, thereby moving the second housing section relative to the erecting means for the second optical element. This movement allows the link to rotate toward the second housing section. Rotation of the link in the manner just described moves the detent on the link out of locking engagement with the erecting means for the first optical element, thereby allowing the aforementioned spring means to move the latter to its operative position as the second optical element moves into its operative position. The above-described latching arrangement is simple, reliable, inexpensive and is adapted to be released either by the operator grasping a housing section and rotating it relative to another housing section to move the camera into its extended, operative position, or by the operator applying a force directly to the viewing device to erect the viewing device and camera simultaneously. Since the latching arrangement consists of components of the erecting system for the optical elements, objectionable latch mechanisms protruding from the exterior surfaces of the housing sections are no longer necessary, thereby making the camera configuration more aesthetically pleasing.

An object of the invention is to provide a camera of the folding type with a collapsible viewing device having a novel latching arrangement for releasably maintaining the viewing device in an inoperative position.

Another object of the invention is to provide a camera of the folding type with a collapsible viewing device which automatically erects upon erecting the camera.

Other objects of the invention will in part be obvious and will, in part, appear hereinafter.

The invention accordingly comprises the apparatus possessing the construction, combination of elements, and arrangement of parts which are exemplified in the following disclosure and the scope of the application which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly in section, of a camera and viewing device embodying the instant invention shown in their extended or operative positions;

DETAILED DESCRIPTION OF THE INVENTION

Figure 3:
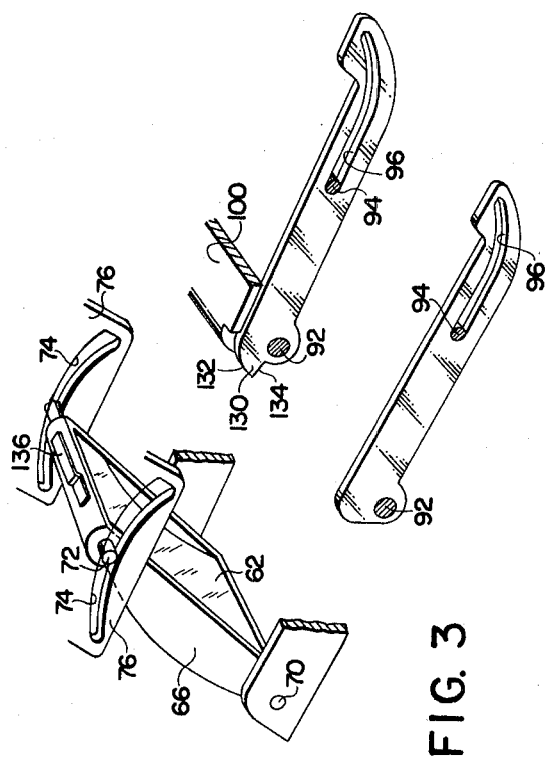
FIG. 3 is a fragmentary perspective view of an alternative latching arrangement for the camera's viewing device.

Reference is now made to FIG. 1 wherein there is shown a foldable, single lens reflex camera 10 of the self-developing type in its extended or operative position. Camera 10 includes first, second, third and fourth housing sections 12, 14, 16 and 18, respectively, pivotally coupled to each other at pivots 13, 15, 17 and 19 for relative movement between the extended position shown in FIG. 1 and the inoperative, folded position shown in FIG. 2. Housing sections 12, 14, 16 and 18 cooperate with a flexible bellows 20, secured thereto to form a six-sided exposure chamber 22.

First housing section 12 includes a wall 24 having laterally spaced flanges 26 (only one of which is shown) extending upwardly therefrom and an opening 28 which extends into exposure chamber 22. Flanges 26 provide a means for mounting a viewing device 30 as will be more fully described hereinafter. Second housing section 14, pivotally connected to housing section 12 at 15, includes means (not shown) for mounting a planar mirror 32 on an interior wall 34 thereof. Third housing section 16 includes a pair of laterally spaced side walls 36 and 38 interconnected by a bottom wall 40 and an end wall 41 to define a U-shaped chamber 42 for receiving a film assemblage including a film container 44 having a plurality of individual film units 46 (only two being shown) therein. Extending forwardly of chamber 42 is a U-shaped roller support housing 48 having a pair of rollers 50, 52 mounted thereon in closing relation to the open end of chamber 42. Roller housing 48 is pivotally coupled to third housing section 16 and is adapted to be pivoted in a counterclockwise manner to move rollers 50 and 52 to a position wherein a film container 44 may be inserted into or withdrawn from chamber 42. Finally, fourth housing section 18 is pivotally coupled near its ends to housing sections 12 and 16 and is provided with means for mounting a lens and shutter assembly 54 and a shutter release button (not shown).

Pivotally mounted within exposure chamber 22 is a reflecting means comprising a support 56 having an echelon type reflecting surface 58 on one side thereof and a planar reflecting surface, e.g., a mirror 60, on the other side thereof. The reflecting means is adapted to be pivoted between the position shown in FIG. 1 wherein surface 58 is a component of the camera's viewing system, and a second position wherein surface 58 is closely adjacent to and parallel with mirror 32 and mirror 60 functions as a component of the camera's exposure system.

Figure 2:
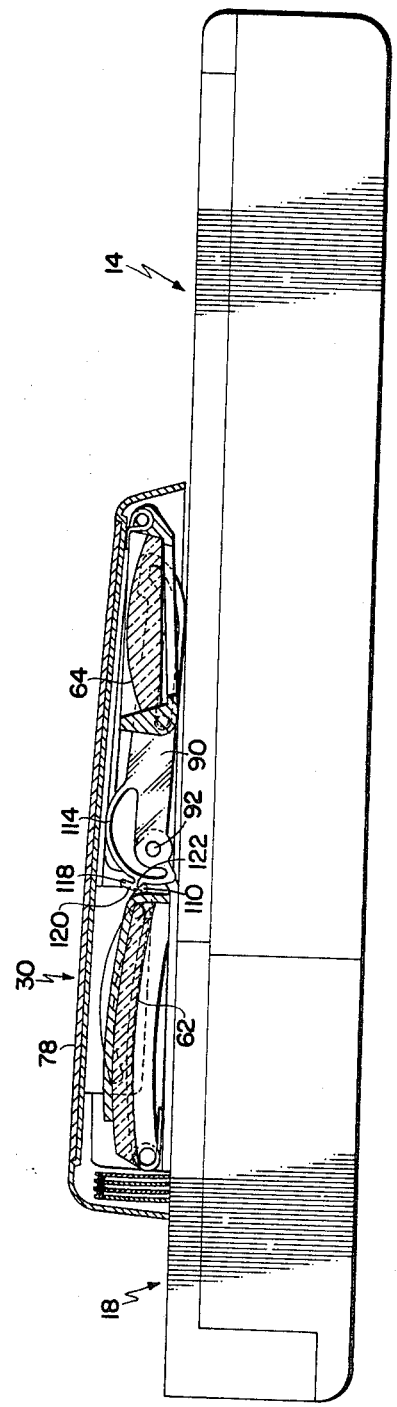
FIG. 2 is an elevational view, partly in section, of the camera and viewing device of FIG. 1 shown in their folded or inoperative positions.

A viewing device 30 including first and second optical means 62 and 64, respectively, is mounted on first housing section 12 for movement between an operative position, as shown in FIG. 1, and an inoperative position as shown in FIG. 2 wherein the optical means 62 and 64 generally lie within the same plane and compliment the compactness of the camera when the latter is in a folded position. The first optical means 62, which is disclosed as a concave mirror, is provided with a first erecting means for guiding the concave mirror 62 between the inoperative and operative positions. The erecting means includes a mirror housing 66 pivotally coupled near its lateral sides by a pin 70 to a pair of tabs 68 (only one of which is shown) extending upwardly from wall 14; a pair of guide pins 72 (only one shown) extending outwardly from opposite sides of mirror housing 66 and adapted to be captured in arcuate guides 74 formed in laterally spaced flanges 76 extending downwardly from a cover 78; and biasing means, e.g., a spring 80 having one end 82 in engagement with wall 14, an intermediate portion wound about pin 70 and the other end 84 curved around guide pin 72. The second optical means, shown as an eye lens 64, also has an erecting means for guiding the eye lens 64 between its operative and inoperative positions. The latter erecting means includes an eye lens housing 86 pivotally coupled at its lateral ends to flanges 26 by pins 88, a pair of laterally spaced links 90 (only one shown) each of which has one end pivotally coupled to flange 26 by a pin 92 and its other end pivotally coupled to a lateral side of eye lens housing 86 by a pin 94 extending away from the housing 86 and into a slot 96 in link 90; and a spring having one end 98 in engagement with a rib 100 extending inwardly from flange 26, an intermediate portion wound about pin 88, and its other end 102 in engagement with eye lens housing 86.

Viewing device 30 is also provided with a collapsible or folding shade 104 for reducing admission of ambient light into the area between concave mirror 62 and eye lens 64 thereby increasing the apparent brightness of the image formed by concave mirror 62. The folding shade 104 is formed by a plurality (4) of thin elongated U-shaped blades 106 pivotally coupled near the free ends of the U to the rearwardly extending flanges 26 of housing section 12 at pivot 88. It will be noted from FIG. 1 that the lowest or first blade 106 is fixedly attached at its forward end to the housing section 12 and is of minimum length, measured from pivot 88, and that each succeeding blade is slightly longer than the one below it. This permits the blades to nest in telescoping fashion as the upper three blades are pivoted downwardly in counterclockwise direction, until their bottom edge bears against housing section 12. The three uppermost blades 106 have inwardly turned flanges 108 at their forward bottom edges and the three lower blades have outwardly turned flanges 110 at their upper forward edges which are adapted to interlock as the upper three blades 106 are rotated upwardly from housing section 12 for sequentially erecting the blades to the positions shown in FIG. 1. It will be noted, that in the erected position, the individual blades 106 overlap one another, thus preventing ambient light from passing therebetween. Shade 104 is spring biased towards the erected or light-blocking position by any suitable means, e.g., by a pair of springs. For a more detailed description of the viewing device, reference is made to the copending application of Edward Coughlan et al., Ser. No. 141,554, filed May 10, 1971 and assigned to the same assignee as the instant application.

Viewing device 30 is provided with latching means for maintaining the optical elements 62 and 64 in their folded or inoperative position, as shown in FIG. 2. In a preferred embodiment, the latching means includes a protuberance 110 extending upwardly from mirror housing 66, as viewed in FIG. 1, and a resilient member 112 which is preferably an integral part of one of the erecting links 90, e.g., link 90 shown in FIG. 1. Resilient member 112 includes an arcuate portion 114, which defines one side of an aperture 116, and an upwardly extending flange 118 having inclined surfaces 120 and 122 on one side thereof.

OPERATION

When the camera and the viewing device are in their folded, inoperative positions, the various components thereof assume the positions shown in FIG. 2. It will be noted that spring 80 cannot move the concave mirror 62 to its operative position because of the latching effect created by the inclined surface 122 of flange 118 overlying protuberance 110 on mirror housing 66. Flange 118, in turn, is maintained in the position shown due to the link 90 being in engagement with housing section 14. Accordingly, since the force of spring 80 is incapable of causing protuberance 110 to deflect flange 118 to a position wherein it can clear the inclined surface 122, and since link 90 is held against clockwise rotation due to its engagement with housing section 14, the optical elements 62 and 64 are maintained in their inoperative position.

The latching means is constructed such that camera 10 and viewing device 30 may be moved to their erected, operative positions in a plurality of ways. For example, the operator may grasp housing section 14 and pivot it in a clockwise direction about hinge 17. This latter movement results in housing sections 14 and 18 being moved about their respective pivots toward the erected position shown in FIG. 1. As housing sections 12 and 14 move relative to each other, housing section 14 attempts to move away from engagement with links 90, thereby allowing spring 102 to pivot eye lens housing 86 in a counterclockwise direction about hinge 88. Movement of housing 86 in a counterclockwise direction is transmitted to each of the links 90 by way of pin and slot connections 94 and 96, respectively, to cause links 90 to rotate in a clockwise direction about hinge 92. Initial movement of links 90 in said clockwise direction moves flange 118 to a position out of engagement with protuberance 110, thereby allowing optical element 62 to be moved by spring 80 in a counterclockwise direction into its operative position. Counterclockwise rotation of optical element 62 is transmitted to cover 78 and blades 106 by the cooperation between pin 72 and the arcuate slot 74 in flange 76, thereby resulting in the cover 78 and blades 106 pivoting about hinge 88 into the extended position shown in FIG. 1. Links 90 continue to follow housing section 14 until pin 94 reaches the end of slot 96, at which time optical element 64 is in its operative position. Alternatively, the camera and viewing device may be moved to their operative positions by grasping the cover 78 in the vicinity of flange 74 and applying an upward force thereon. This upward force on cover 78 is sufficient to cause protuberance 110 on mirror housing 66 to deflect flange 118 on link 90 to a position wherein the protuberance 110 is clear of the inclined surface 122, thereby allowing optical element 62 to move to its operative position. This upward movement on cover 78 is also transmitted to housing section 12, due to its connection therewith, to move housing section 12 relative to housing section 14. Relative motion between housing sections 12 and 14 allows links 90 to rotate about hinge 92 in a clockwise direction until optical element 64 reaches its operative position.

Still another way of erecting the camera and viewing device is to grasp the right-hand portion of cover 78 (as viewed in FIG. 2) and apply an upward force thereto to cause relative movement between housing sections 12 and 14. As stated above, optical element 64 will automatically move to its erected, operative position as links 90 follow the movement of housing section 14 into the extended, operative position. Once optical element 64 is in its operative position and the camera is fully erected, the operator of the camera may release cover 78 and the first optical element 62 will be moved to its operative position by spring 80. Suitable erecting linkage (not shown) may be provided for maintaining the camera in its extended operative position.

The camera and its viewing system may be moved to their folded, inoperative positions in a plurality of ways. For example, the operator may, after releasing the aforementioned camera erecting linkage, apply a force to cover 78 in the vicinity of flange 76, thereby causing cover 78 to rotate about hinge 88 in a counterclockwise direction. Counterclockwise rotation of cover 78 rotates optical element 62 in a clockwise direction into its inoperative position. Continued downward force on cover 78 is transmitted to housing section 12 to rotate housing section 18 in a counterclockwise direction about hinge 19. This latter movement of housing section 18 results in relative movement taking place between housing section 14 and links 90. As the angle between housing sections 12 and 14 approaches 180°, housing section 14 engages the right-hand portion, as viewed in FIG. 1, of links 90 and rotates them in a counterclockwise direction. Counterclockwise rotation of links 90 is transmitted to eye lens housing 86 via the aforementioned pin and slot connection 94 and 96 to rotate eye lens housing 86 in a clockwise direction into its inoperative position. During the last few degrees of counterclockwise rotation of links 90, the flange 118 located on one of the links 90 moves into latching engagement with protuberance 110 to maintain optical element 62 in its inoperative position when the force is removed from cover 78. Alternatively, a force may be applied to housing section 14 to rotate it in a counterclockwise direction about hinge 17, thereby resulting in relative movement between housing sections 12 and 14. As stated above, housing section 14 moves into engagement with links 90 to cause clockwise rotation of optical element 64 into its inoperative position as housing sections 12 and 14 move into a common plane. A downward force is then applied to cover 78 to rotate optical element 62 into its inoperative position. As optical element 62 approaches its inoperative position, protuberance 110 engages inclined surface 120 on flange 118 and deflects the flange 118 to a position wherein protuberance 110 can move into latching engagement with inclined surface 122, thereby releasably retaining optical element 62 in the inoperative position.

An alternative embodiment of the latching means for the viewing device 30 is shown in FIG. 3. In this view the links 90 are shown in the position they assume when optical element 64 is in its inoperative, folded position, and optical element 62 is shown in a position intermediate its operative and inoperative positions. In this embodiment, the resilient member 112 forming an integral part of one of the links 90 is replaced by a protuberance 130 having inclined surfaces 132 and 134 and the concave mirror housing 66 is provided with a resilient member 136 in the form of a piece of spring steel mounted on housing 66 in cantilever fashion. The latching means shown in the FIG. 3 embodiment operate in substantially the same manner as the latching means of FIGS. 1 and 2.

From the foregoing it can be seen that there has been disclosed a novel, inexpensive and highly reliable latching means for use on a folding camera having a foldable viewing device. The latching means is adapted to release elements of the viewing device for movement into their operative positions upon initial erection of the foldable camera thereby freeing the operator from the task of manually erecting the viewing device. The latching means is incorporated into the erecting linkage of the viewing device thereby obviating the need for objectionable latch mechanisms protruding from the camera body.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera adapted for movement between folded and extended positions and including a viewing device for providing an image of a scene to be photographed, comprising:

a housing;

first and second optical means operatively associable with each other for providing said image, said first and second optical means being coupled to said housing for movement relative to each other between inoperative and operative positions;

first and second erecting means coupled to said first and second optical means, respectively, for guiding said first and second optical means between said inoperative and operative positions;

latching means extending from one of said first and second erecting means and engageable with the other of said first and second erecting means for releasably retaining said first and second optical means in said inoperative position; and means responsive to movement of said camera housing from said folded position toward said extended position for releasing said latching means.

2. A folding camera as defined in claim 1 wherein said latching means includes resilient means coupled to said first erecting means and a protuberance extending from said second erecting means.

3. A folding camera as defined in claim 2 wherein said housing includes first and second housing sections coupled to each other for movement between said folded and extended positions, means mounting said first and second optical means on said first housing section, said second erecting means including said means responsive to movement of said camera housing from said folded position toward said extended position for releasing said latching means when said first and second optical means are in said inoperative position.

4. A folding camera as defined in claim 3 wherein said first erecting means includes biasing means for urging said first optical means toward said operative position and said responsive means urges said second optical means toward said operative position, whereby movement of said first and second housing sections from said folded position toward said extended position releases said latching means to allow said first and second optical means to automatically move into said operative position.

5. A folding camera as defined in claim 1 wherein said latching means includes resilient means extending from said second erecting means and adapted to engage means on said first erecting means for releasably retaining said first and second optical means in said inoperative position.

6. A folding camera as defined in claim 5 wherein said housing includes first and second housing sections coupled to each other for movement between said folded and extended positions, means mounting said first and second optical means on said first housing section, said second erecting means including said means responsive to movement of said camera housing from said folded position toward said extended position for releasing said latching means when said first and second optical means are in said inoperative position.

7. A folding camera as defined in claim 6 wherein said first erecting means includes biasing means for urging said first optical means toward said operative position and said responsive means urges said second optical means toward said operative position, whereby movement of said first and second housing sections from said folded position toward said extended position releases said latching means to allow said first and second optical means to automatically move into said operative position.

8. A folding camera as defined in claim 5 wherein said second erecting means includes a link pivotally coupled between said housing and said second optical means and said resilient means in an integral part of said link.

* * * * *